(12) United States Patent
Sasaki (10) Patent No.: US 12,320,422 B1
(45) Date of Patent: Jun. 3, 2025

(54) CONTROL DEVICE FOR VEHICLE

(71) Applicant: TOYOTA JIDOSHA KABUSHIKI KAISHA, Toyota (JP)

(72) Inventor: Katsuya Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/931,389

(22) Filed: Oct. 30, 2024

(30) Foreign Application Priority Data

Nov. 30, 2023 (JP) ................................. 2023-203381

(51) Int. Cl.
| | |
|---|---|
| *F16H 63/48* | (2006.01) |
| *F16H 59/18* | (2006.01) |
| *F16H 59/44* | (2006.01) |
| *F16H 59/50* | (2006.01) |
| *F16H 59/66* | (2006.01) |
| *F16H 59/70* | (2006.01) |
| *F16H 63/34* | (2006.01) |

(52) U.S. Cl.
CPC ............. *F16H 63/48* (2013.01); *F16H 59/18* (2013.01); *F16H 59/44* (2013.01); *F16H 59/50* (2013.01); *F16H 59/66* (2013.01); *F16H 59/70* (2013.01); *F16H 63/3458* (2013.01); *F16H 2059/663* (2013.01); *F16H 2059/708* (2013.01)

(58) Field of Classification Search
CPC .......... F16H 59/18; F16H 59/44; F16H 59/50; F16H 59/66; F16H 59/70; F16H 2059/663; F16H 2059/708; F16H 63/48; F16H 63/3548

See application file for complete search history.

(56) References Cited

U.S. PATENT DOCUMENTS

| | | | |
|---|---|---|---|
| 9,892,578 B1 * | 2/2018 | Gage | .................. G07C 9/00182 |
| 2017/0129465 A1 * | 5/2017 | Ozawa | .................... B60T 1/062 |
| 2017/0241544 A1 * | 8/2017 | Terai | ....................... F16H 61/32 |
| 2020/0217414 A1 | 7/2020 | Nakade | |

FOREIGN PATENT DOCUMENTS

JP 2020-111097 A 7/2020

* cited by examiner

*Primary Examiner* — Edwin A Young
(74) *Attorney, Agent, or Firm* — Oblon, McClelland, Maier & Neustadt, L.L.P.

(57) ABSTRACT

A control device for a vehicle that includes a switching device for switching a power transmission device between a parking state and a non-parking state. The control device includes: (a) an opening/closing determination portion for determining whether a vehicle door is open or closed; (b) a switching control portion for executing an automatic parking control for switching the power transmission device to the parking state, in a case in which it is determined that the door is open, when a vehicle running speed is not higher than a predetermined speed, with the power transmission device being in the non-parking state, and (c) a reverse-parking determination portion for determining whether or not a vehicle driver is performing a reverse parking. The switching control portion does not execute the automatic parking control, in a case in which it is determined that the driver is performing the reverse parking.

5 Claims, 4 Drawing Sheets

CONTROL DEVICE FOR VEHICLE

This application claims priority from Japanese Patent Application No. 2023-203381 filed on Nov. 30, 2023, the disclosure of which is herein incorporated by reference in its entirety.

FIELD OF THE INVENTION

The present invention relates to a control device for a vehicle that switches a power transmission device between a parking state and a non-parking state in accordance with a control command signal.

BACKGROUND OF THE INVENTION

There is well known a control device for a vehicle that that includes (i) a power source, (ii) a drive wheel, (iii) a power transmission device which is configured to transmit a power of the power source to the drive wheel and which includes a rotary member rotatable together with the drive wheel, and (iv) a switching device that is configured to switch the power transmission device between a parking state and a non-parking state in accordance with a control command signal, such that the rotary member is inhibited from being mechanically rotated when the power transmission device is placed in the parking state, and such that the rotary member is allowed to be rotated when the power transmission device is placed in the non-parking state. For example, a control device for a vehicle described in Patent Document 1 is such a control device. In this Patent Document 1, it is disclosed that an automatic parking control is executed for causing the switching device to switch the power transmission device to the parking state, in a case in which a door opening/closing determination is an opening determination indicating that a door of the vehicle is open, when a running speed of the vehicle is not higher than a predetermined speed, with the power transmission device being placed in the non-parking state.

PRIOR ART DOCUMENT

Patent Document

[Patent Document 1]
    Japanese Patent Application Laid-Open No. 2020-111097

SUMMARY OF THE INVENTION

As a running state of the vehicle, there is a reverse parking in which a driver of the vehicle parks the vehicle by reversing the vehicle. When performing the reverse parking, the driver may open the door and move the vehicle backward while visually checking a rear side of the vehicle. In technique described in Patent Document 1, if the door is opened during the reverse parking, the automatic parking control is executed for switching the power transmission device to the parking state.

The present invention has been made in view of the above circumstances, and an object of the present invention is to provide a control device for a vehicle, wherein the control device enables a driver of the vehicle to perform a reverse parking while opening a door and visually checking a rear side of the vehicle while operating automatic parking control functions.

According to the invention, there is provided a control a control device for a vehicle that includes (i) a power source, (ii) a drive wheel, (iii) a power transmission device which is configured to transmit a power of the power source to the drive wheel and which includes a rotary member rotatable together with the drive wheel, and (iv) a switching device that is configured to switch the power transmission device between a parking state and a non-parking state in accordance with a control command signal, such that the rotary member is inhibited from being mechanically rotated when the power transmission device is placed in the parking state, and such that the rotary member is allowed to be rotated when the power transmission device is placed in the non-parking state. The control device includes: (a) an opening/closing determination portion configured to make a door opening/closing determination as to whether a door of the vehicle is open or closed; (b) a switching control portion configured to execute an automatic parking control for causing the switching device to switch the power transmission device to the parking state, in a case in which the door opening/closing determination is an opening determination indicating that the door is open, when a running speed of the vehicle is not higher than a predetermined speed close to zero, with the power transmission device being placed in the non-parking state, and (c) a reverse-parking determination portion configured to determine whether or not a driver of the vehicle is performing a reverse parking for parking the vehicle by reversing the vehicle. The switching control portion does not execute the automatic parking control, in a case in which the reverse-parking determination portion determines that the driver is performing the reverse parking.

In the control device according to the invention, the automatic parking control is executed, in the case in which the door opening/closing determination is the opening determination, when the running speed of the vehicle is not higher than the predetermined speed, with the power transmission device being placed in the non-parking state. However, when it is determined that the driver is performing the reverse parking, the automatic parking control is not executed. Therefore, while a function of the automatic parking control is being operated, the driver can open the door and perform the reverse parking while visually checking the rear side of the vehicle.

DETAILED DESCRIPTION OF PREFERRED EMBODIMENT

Hereinafter, an embodiment of the present invention will be described in detail with reference to the drawings.

EMBODIMENT

Figure 1:
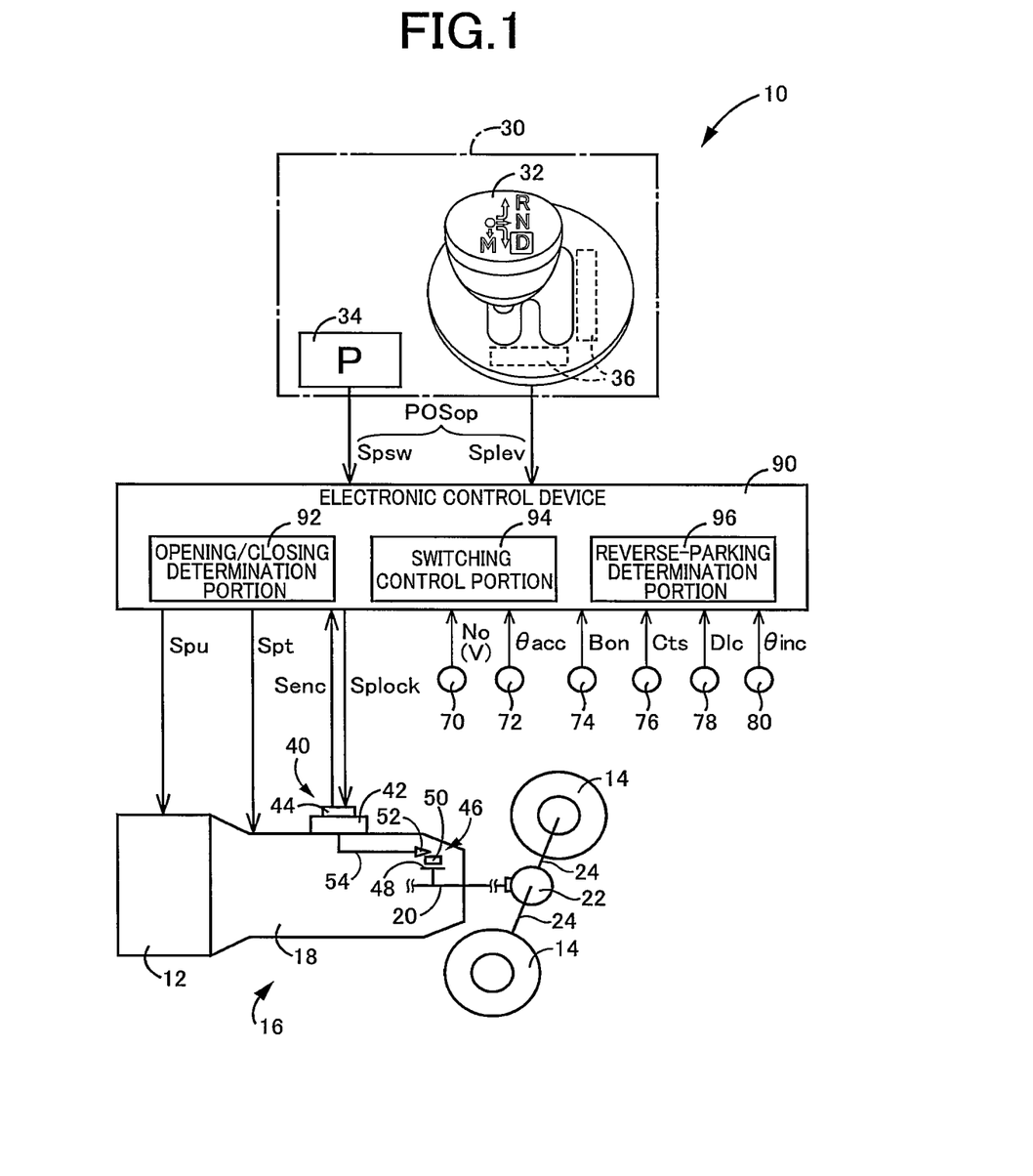
FIG. 1 is a view showing a schematic configuration of a vehicle to which the present invention is applied, and is a view showing control functions for various controls in the vehicle and main parts of a control system.
Figure 2:
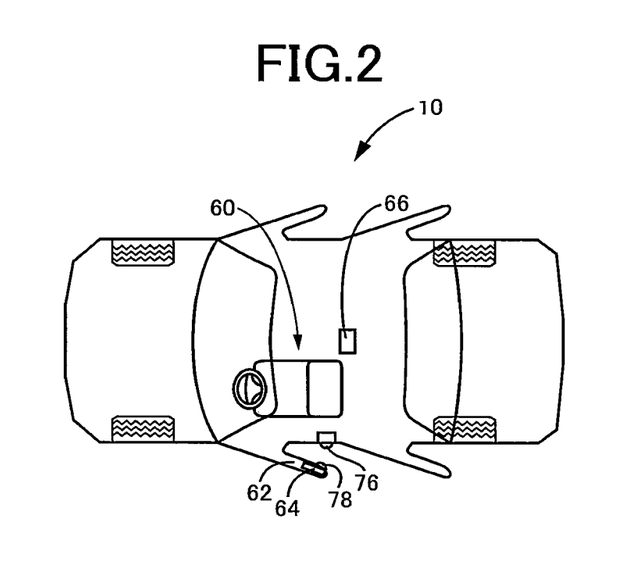
FIG. 2 is a view for explaining a schematic configuration of a vehicle to which the present invention is applied.

FIGS. 1 and 2 are views for explaining a schematic configuration of a vehicle 10 to which the present invention is applied. FIG. 1 is a view showing control functions and main parts of a control system for various controls in the vehicle 10. In FIGS. 1 and 2, the vehicle 10 includes a power source 12, drive wheels 14 and a power transmission device 16 that transmits a power of the power source 12 to the drive wheels 14. The power is synonymous with torque or force unless otherwise distinguished.

The power source 12 is, for example, a known internal combustion engine such as an engine. Alternatively, the power source 12 is a known rotary electric machine such as a motor generator. Alternatively, the vehicle 10 may include the rotary electric machine as the power source 12 in addition to the internal combustion engine.

The power transmission device 16 includes, for example, an automatic transmission 18 connected to the power source 12, a differential gear device 22 connected to an output shaft 20 and left and right axles 24 connected to the differential gear device 22. The output shaft 20 is an output rotary member of the automatic transmission 18 and is a rotary member that is rotatable together with the drive wheels 14.

The vehicle 10 further includes a shift operation device 30, a switching device 40, a driver's seat 60, a driver's seat door 62, a driver's seat door lock device 64 and a courtesy lamp 66. The courtesy lamp 66 is a lamp provided on the driver's seat door 62 and/or in a vehicle cabin.

The shift operation device 30 is an operation device for selecting one of a plurality of types of shift positions POSsh in the automatic transmission 18 by a manual operation, that is, an operation device that receives a request for switching one of the shift positions POSsh to another by being manually operated. The shift operation device 30 is operated by the driver to one of operation positions POSop that corresponds to a selected one of the shift positions POSsh. The operation positions POSop include, for example, a parking operation position, a reverse driving operation position, a neutral operation position and a forward driving operation position. The shift positions POSsh include, for example, a parking position, a reverse drive position, a neutral position and a forward drive position. The shift positions POSsh are synonymous with shift ranges of the automatic transmission 18.

The parking operation position is an operation position for selecting the parking position of the automatic transmission 18 in which the automatic transmission 18 is in a neutral state and the output shaft 20 is mechanically inhibited from being rotated. The neutral state of the automatic transmission 18 is a state in which a power transmission in the automatic transmission 18 is interrupted, that is, a state in which the automatic transmission 18 cannot transmit the power. The neutral state of the automatic transmission 18 is synonymous with the neutral state of the power transmission device 16, and is a state in which power transmission in the power transmission device 16 is interrupted. The state in which the rotation of the output shaft 20 is mechanically inhibited is a parking lock state in which the output shaft 20 is fixed so as not to be rotatable, that is, a parking state of the power transmission device 16. The parking operation position is an operation position corresponding to a parking state of the power transmission device 16. The output shaft 20 is non-rotatably fixed by the switching device 40.

The reverse driving operation position is an operation position for selecting a reverse drive position of the automatic transmission 18 that enables the vehicle 10 to travel in reverse. The state that enables the vehicle 10 to perform a reverse running is a reverse-running enabling state of the power transmission device 16. The neutral operation position is an operation position for selecting the neutral position of the automatic transmission 18 in which the automatic transmission 18 is in a neutral state. The forward driving operation position is an operation position for selecting the forward drive position of the automatic transmission 18 that enables forward travel of the vehicle 10. The state that enables the vehicle 10 to perform a forward running is a forward-running enabling state of the power transmission device 16. The neutral state, the forward-running enabling state, and the reverse running enabled state of the power transmission device 16 are non-parking lock states in which the rotation of the output shaft 20 is allowed, that is, non-parking states of the power transmission device 16. The reverse driving operation position, the neutral operation position and the forward driving operation position are non-parking operation positions corresponding to the non-parking state of the power transmission device 16. Each of the non-parking operation positions is an operation position for selecting one of non-parking positions of the automatic transmission 18 such as the reverse drive position, the neutral position or the forward drive position in which the parking lock state is cancelled.

The shift operation device 30 includes a shift lever 32 and a parking switch 34 that are selectively operated by the driver to a plurality of operation positions POSop. The shift lever 32 and the parking switch 34 are both momentary type operators that are returned to their original positions in a state where no external force is applied. The driver selectively operates the shift lever 32 to a corresponding one of the operation positions POSop to select a desired one of the non-parking positions of the shift positions POSsh. The parking switch 34 is operated by the driver to establish the parking position as one of the shift positions POSsh.

The shift operation device 30 includes a lever position sensor 36 that outputs a lever position signal Splev corresponding to the non-parking operation position to an electronic control device 90 described later. The parking switch 34 is, for example, a momentary type push button switch, and is pushed to a parking operation position by the driver. The parking switch 34 outputs a parking switch signal Spsw corresponding to the parking operation position to the electronic control device 90 every time the parking switch 34 is pushed to the parking operation position. The lever position signal Splev and the parking switch signal Spsw are signals indicating the operation positions POSop.

The switching device 40 includes an electric actuator 42, an encoder 44 and a parking lock mechanism 46. The switching device 40 switches the shift positions POSsh of the automatic transmission 18 by the operation of the electric actuator 42. The parking lock mechanism 46 includes a parking lock gear 48, a parking lock pawl 50, a cam 52 and a parking rod 54. The parking lock gear 48 is a member provided so as to be rotated integrally with the output shaft 20. The parking lock pawl 50 has a pawl portion that meshes with gear teeth of the parking lock gear 48, and is a member that can mesh with the parking lock gear 48. The cam 52 is provided in a distal end portion of the parking rod 54 on a side of the parking lock pawl 50. The cam 52 is a tapered member that engages the parking lock pawl 50 with the parking lock gear 48 when the cam 52 is moved toward the parking lock pawl 50. The parking rod 54 is a member that supports the cam 52 in an end portion thereof, and is mechanically connected to the electric actuator 42 via a member (not shown) in another end portion thereof.

The electric actuator 42 is operated in accordance with a parking switching control command signal Splock supplied from the electronic control device 90 described later. The switching device 40 switches the power transmission device 16 between a parking state and a non-parking state by the electric actuator 42 being operated. That is, the switching device 40 switches the shift positions POSsh between the parking position and the non-parking positions. In this way, the switching device 40 is a switching device that switches the power transmission device 16 between the parking state and the non-parking state in accordance with the control command signal supplied from the electronic control device 90. In the vehicle 10, the shift positions POSsh are switched using a shift-by-wire (SBW) system.

The driver's seat door lock device 64 is provided on the driver's seat door 62. The driver's seat door lock device 64 switches the driver's seat door 62 between a locked state and an unlocked state by forward rotation and reverse rotation of a built-in door lock motor (not shown).

The vehicle 10 further includes the electronic control device 90 as a controller including a control device of the vehicle 10 related to controls of the automatic transmission 18 and the like. The electronic control device 90 includes a so-called microcomputer including, for example, a CPU, a RAM, a ROM and an input/output interface. The CPU executes various controls of the vehicle 10 by performing signal processing in accordance with programs stored in the ROM in advance while using a temporary storage function of the RAM.

The electronic control device 90 is supplied with various signals based on detection values from various sensors provided in the vehicle 10. The various sensors and the like are, for example, the parking switch 34, the lever position sensor 36, the encoder 44, an output rotational speed sensor 70, an accelerator opening sensor 72, a brake switch 74, a courtesy switch 76, a lock switch 78 and an inclination angle sensor 80. The various signals include, for example, a parking switch signal Spsw, a lever position signal Splev, a pulse signal Senc, an output rotational speed No, an accelerator opening degree θacc, a brake-ON signal Bon, a courtesy signal Cts, a lock signal Dlc and an inclination angle θinc.

The courtesy switch 76 is a sensor that detects opening and closing of a door of the vehicle 10, and is provided, for example, on a B pillar near the driver's seat 60. The courtesy switch 76 is a switch that is switched between an ON state and an OFF state in accordance with opening and closing of the driver's seat door 62, and is a switch that activates the courtesy lamp 66 that is lit when the driver's seat door 62 is open. The lock switch 78 is a sensor that detects opening and closing of a door of the vehicle 10, and is provided in the driver's seat door lock device 64, for example. The lock switch 78 is an ON/OFF switch that is switched between an ON state and an OFF state in accordance with opening and closing of the driver's seat door 62. The courtesy switch 76 and the lock switch 78 are a plurality of sensors provided in the driver's seat door 62, which is the same door.

The pulse signal Senc is a signal for acquiring an encoder count corresponding to the operation position of the electric actuator 42. The output rotational speed No is a rotational speed of the output shaft 20 corresponding to the running speed V. The accelerator opening degree θacc is an accelerator operation amount of the driver indicating a magnitude of the acceleration request in the operation of an accelerator operation member by the driver. The operation of the accelerator operation member may be referred to as an accelerator operation. The brake-ON signal Bon is a signal indicating a state in which a brake operation member for operating a wheel brake is operated by the driver. The operation of the brake operation member may be referred to as a brake operation. The courtesy signal Cts is an opening/closing signal corresponding to opening/closing of the door of the vehicle 10. The lock signal Dlc is an opening/closing signal corresponding to opening/closing of the door of the vehicle 10, which is different from the courtesy signal Cts. The inclination angle θinc is an angle of inclination in a longitudinal direction of the vehicle 10, and is also a signal indicating a gradient of a running road surface.

The electronic control device 90 outputs various command signals to the devices provided in the vehicle 10. The devices are, for example, the power source 12, the automatic transmission 18, the electric actuator 42 and the like. The various control command signals are, for example, a power source control command signal Spu for controlling the power source 12, a transmission control command signal Spt for controlling the automatic transmission 18, a parking switching control command signal Splock for controlling the operation of the switching device 40 and the like.

The electronic control device 90 includes an opening/closing determination portion 92 and a switching control portion 94 in order to execute various controls in the vehicle 10.

The opening/closing determination portion 92 make a door opening/closing determination as to whether a door of the vehicle 10 is open or closed, by using the opening/closing signal corresponding to the opening/closing of the door of the vehicle 10. In the present embodiment, a state in which the door of the vehicle 10 is open is referred to as a door open state, and a state in which the door of the vehicle 10 is closed is referred to as a door closed state. The opening/closing determination portion 92 makes an opening determination indicating that the door is open in the door open state, and makes a closing determination indicating the door is closed in the door closed state.

The opening/closing determination portion 92 determines that the door is open when at least one of the courtesy signal Cts and the lock signal Dlc is changed from a closing signal Dcls corresponding to the door closed state, to an opening signal Dopn corresponding to the door open state. The opening/closing determination portion 92 determines that the door is closed when at least one of the courtesy signal Cts and the lock signal Dlc is changed from the opening signal Dopn to the closing signal Dcls.

Figure 3:
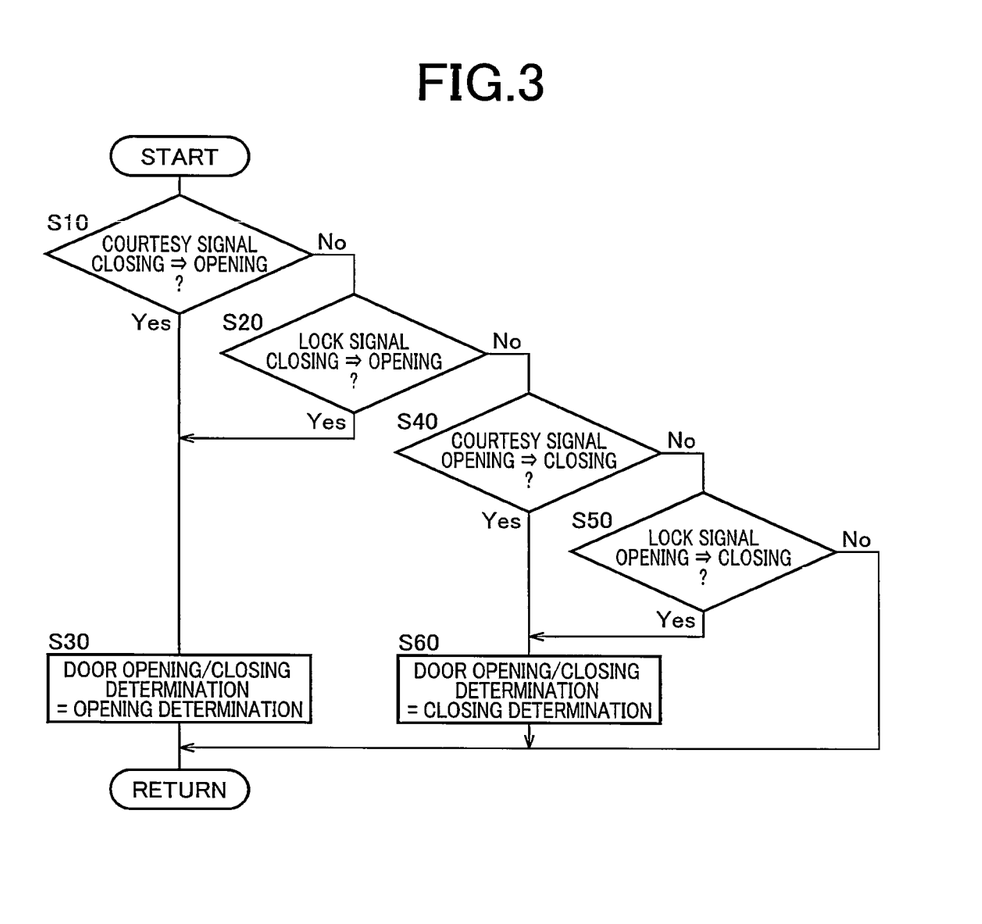
FIG. 3 is a flowchart for explaining a main part of a control operation of an electronic control device, and is a flowchart for explaining a control routine executed for determining whether the door is opened or closed.

FIG. 3 is a flowchart for explaining a main part of a control operation of the electronic control device 90, and is a flowchart for explaining a control routine for making the door opening/closing determination. This control routine is executed in a repeated manner, for example.

Each step of the control routine shown in the flow chart of FIG. 3 corresponds to function of the opening/closing determination portion 92. In step (hereinafter, step is omitted) S10, it is determined whether or not the courtesy signal Cts has been changed from the closing signal Dcls to the opening signal Dopn. If the determination in S10 is negative, it is determined in S20 whether or not the lock signal Dlc has being changed from the closing signal Dcls to the opening signal Dopn. If the determination in S10 is positive or if the determination in S20 is positive, the door opening/closing determination is set to the opening determination in S30. If the determination in S20 is negative, it is determined in S40 whether the courtesy signal Cts has been changed from the opening signal Dopn to the closing signal Dcls. If the determination in S40 is negative, it is determined in S50 whether the lock signal Dlc has been changed from the opening signal Dopn to the closing signal Dcls. If the determination in S50 is negative, one cycle of execution of the control routine is terminated. If the determination in S40 is positive, or if the determination in S50 is positive, the door opening/closing determination is set to the closing determination in S60.

The switching control portion 94 electrically switches the shift positions POSsh of the automatic transmission device 18 by the switching device 40 based on the operation positions POSop in the shift operation device 30. For example, the switching control portion 94 sets a requested position that is one of the shift positions POSsh desired by the driver, based on the lever position signal Splev and the parking switch signal Spsw. The switching control portion 94 performs switching to the requested position that is one of the shift positions POSsh from another one of the shift positions POSsh. When the switching control portion 94 detects an input of the parking switch signal Spsw while one of the non-parking positions is established as one of the shift positions POSsh, the switching control portion 94 establishes the parking position as the requested position. The switching control portion 94 then switches the one of the non-parking positions to the parking position by operating the electric actuator 42 so as to place the parking lock mechanism 46 into the parking lock state. On the other hand, when the switching control portion 94 detects an input of the lever position signal Splev while the parking position is established as one of the shift positions POSsh, the switching control portion 94 establishes one of the non-parking positions corresponding to the lever position signal Splev as the requested position. The switching control portion 94 then switches the parking position to the one of the non-parking positions by operating the electric actuator 42 so as to place the parking lock mechanism 46 in the non-parking lock state. In addition, the switching control portion 94 establishes the one of the of the non-parking positions corresponding to the requested position.

The switching control portion 94 executes the automatic parking control CNap, in a case in which the door opening/closing determination made by the by the opening/closing determination portion 92 is the opening determination, when the running speed V of the vehicle 10 is not higher than the predetermined speed Vf close to zero, with the power transmission device 16 being placed in the non-parking state. The automatic parking control CNap is control for switching the power transmission device 16 to the parking state by the switching device 40. That is, the switching control portion 94 executes the automatic parking control CNap when the running speed V is equal to or lower than the predetermined speed Vf and one of the non-parking positions is established as one of the shift positions POSsh, and the door opening/closing determination is the opening determination. The automatic parking control CNap is control for switching the shift positions POSsh to the parking position by operating the electric actuator 42 so as to place the parking lock mechanism 46 into the parking lock state.

The predetermined speed Vf is a predetermined running speed of the vehicle 10 for determining a stop of the vehicle 10, which is determined in consideration of a response delay of the running speed V based on the detection value of the output rotational speed sensor 70 with respect to a reduction of the actual running speed V at the time of a sudden stop of the vehicle 10, for example.

The automatic parking control CNap is a control for automatically switching one of the non-parking positions to the parking position when the driver's intention to get off the vehicle 10 is detected in a state in which the one of the non-parking positions is established as one of the shift positions POSsh. The switching control portion 94 detects the driver's intention to get off the vehicle 10 based on whether or not the door opening/closing determination is the opening determination.

In order to further improve a reliability of detecting the driver's intention to get off the vehicle 10, in addition to the door opening/closing determination being the opening determination, for example, a brake-OFF state in which the driver does not perform a brake operation may be used. The switching control portion 94 executes the automatic parking control CNap, in a case in which the brake-OFF state is established in addition to the door opening/closing determination being the opening determination, when the running speed V is equal to or lower than the predetermined speed Vf with one of the non-parking positions being established as one of the shift positions POSsh.

When the driver performs a reverse parking to park the vehicle 10 by reversing the vehicle 10, the driver may open the driver's seat door 62 and move the vehicle 10 backward while visually checking a rear side of the vehicle 10. When the driver opens the driver's seat door 62 without the intention of getting off the vehicle 10, for example, when the driver opens the driver's seat door 62 with the intention of performing the reverse parking, the automatic parking control CNap is unnecessary. When the driver's intention of performing the reverse parking is detected, the switching control portion 94 skips the automatic parking control CNap and does not execute the automatic parking control CNap.

The electronic control device 90 further includes a reverse-parking determination portion 96 for the driver to open the driver's seat door 62 and perform the reverse parking while visually checking the rear side of the vehicle 10.

The reverse-parking determination portion 96 determines whether or not the driver is performing the reverse parking. That is, the reverse-parking determination portion 96 detects whether the driver intends to perform the reverse parking.

When the running speed V is equal to or lower than the predetermined speed Vf and the power transmission device 16 is placed in the non-parking state, the switching control portion 94 executes the automatic parking control CNap if it is determined that the door opening/closing determination is the opening determination and the reverse parking is not being performed by the driver. On the other hand, the switching control portion 94 does not execute the automatic parking control CNap if it is determined that the driver is performing the reverse parking.

The reverse-parking determination portion 96 determines that the driver is performing the reverse parking when the power transmission device 16 is in the reverse-running enabling state and the accelerator opening degree θacc is equal to or less than a predetermined opening degree θaccf. The reverse-running enabling state of the power transmission device 16 is synonymous with the reverse drive position being established as one of the shift positions POSsh.

The predetermined opening degree θaccf is a predetermined upper limit of the accelerator opening degree θacc, such that it can be determined that the drive has the intention of performing the reverse parking as long as the accelerator opening degree θacc is not larger than the predetermined upper limit. In other words, the predetermined opening degree θaccf is a predetermined upper limit of the accelerator opening degree θacc at which it can be considered that the driver intends to move the vehicle 10 backward with a slight acceleration. When the accelerator opening degree θacc is zero, it can be considered that the driver intends to move the vehicle 10 backward at a slight acceleration by using a creep phenomenon. The creep phenomenon is a phenomenon in which the vehicle 10 moves slowly when a brake-OFF operation is performed while the accelerator is OFF, for example. Therefore, the predetermined speed Vf may be set to, for example, a predetermined upper limit of the running speed V when the vehicle 10 moves backward with the accelerator opening θacc being equal to or smaller than the predetermined opening θaccf.

The reverse-parking determination portion 96 determines that the driver is not performing the reverse parking when the power transmission device 16 is not in the reverse-running enabling state. The case in which the power transmission device 16 is not in the reverse-running enabling state is, for example, a case in which the power transmission device 16 is in the forward-running enabling state or a case in which the state of the power transmission device 16 is in the neutral state. The power transmission device 16 being in the forward-running enabling state is synonymous with the forward drive position being established as one of the shift positions POSsh. The neutral state of the power transmission device 16 is synonymous with the neutral position being established as one of the shift positions POSsh.

Alternatively, the reverse-parking determination portion 96 determines that the driver is not performing the reverse parking when the power transmission device 16 is in the reverse-running enabling state but the accelerator opening degree θacc exceeds the predetermined opening degree θaccf. When the reverse drive position is established as one of the shift positions POSsh, if the accelerator operation amount is increased much in the door open state, there is a risk of safety issues. When the accelerator opening θacc exceeds the predetermined opening θaccf, it is determined that the driver is not performing the reverse parking, and the automatic parking control CNap is executed to prevent reverse movement of the vehicle 10. From another point of view, it is assumed that no danger occurs even in the door open state if the accelerator opening degree θacc is small enough to barely move the vehicle 10. Only when the vehicle 10 runs slowly during the reverse parking, the automatic parking control CNap is skipped and not executed even if the door is opened, considering that convenience is important. When the door is closed, the vehicle 10 can be driven with the reverse driving position being established even if the accelerator operation amount is increased much.

Here, the reverse parking on a slope will be described. As the reverse parking on a slope road, for example, a case in which the vehicle 10 is parked backward in a direction of ascending a downward slope will be exemplified. As an operation procedure of the driver in this case, first, the driver causes the vehicle 10 to run on a downhill and to stop (step [1]). Next, the driver selects the reverse driving operation position as one of the operation positions POSop in the accelerator-OFF state. Thus, the forward drive position as one of the shift positions POSsh is switched to the reverse drive position as another one of the shift positions POSsh (step [2]). Next, the driver opens the driver's seat door 62 to check the rear side of the vehicle 10 (step [3]). Next, the driver performs the accelerator operation at the accelerator opening degree θacc which is a low opening degree to the extent that the vehicle 10 can barely move backward (step [4]).

At the time when the step [3] is implemented, the accelerator opening degree θacc is zero. At this time, it is desirable that the automatic parking control CNap is skipped. However, if a lower limit is set for the accelerator opening degree θacc and it is determined whether or not the driver is performing the reverse parking, the automatic parking control CNap could be executed at this time point. In the present embodiment, only an upper limit is set for the accelerator opening degree θacc, and when the accelerator opening degree θacc is equal to or less than the predetermined opening degree θaccf, it is determined that the driver is performing the reverse parking, and the automatic parking control CNap is skipped. Therefore, at this time, the automatic parking control CNap is not executed.

In the above-described step [4], while the accelerator increasing operation is small, the vehicle 10 could slide down the downhill. However, as a characteristic of the driver, the accelerator increasing operation is increased in order to prevent the vehicle 10 from sliding down. Therefore, it can be considered that the driver intends to perform the reverse parking when the magnitude of the driving force request by the driver is not excessive and can move the vehicle 10 backward against the sliding down on the downhill. For example, the accelerator opening degree θacc corresponding to the magnitude of the driving force requested by the driver at this time, is set to the predetermined opening degree θaccf.

A slope road driving force Fs [N] shown in the following Equation (1) is a vehicle driving force F for maintaining the vehicle 10 in a stopped state against the sliding down on the downhill. In the following Equation (1), "θinc [rad]" is an inclination angle of the vehicle 10 whose front side is oriented in a downward direction, "m [kg]" is a weight of the vehicle 10, and "g [m/s$^2$]" is a gravitational acceleration. The predetermined opening degree θaccf is, for example, a value larger than the accelerator opening degree θacc for generating the slope road driving force Fs, and is set to the accelerator opening degree θacc that is obtained by adding an amount for moving the vehicle 10 backward at a slight acceleration on the downward slope, to the accelerator opening degree θacc for generating the slope road driving force Fs. In this way, the reverse-parking determination portion 96 sets the predetermined opening degree θaccf based on the inclination angle θinc of the vehicle 10.

$$Fs = m \times g \times \sin \theta inc \qquad (1)$$

Figure 4:
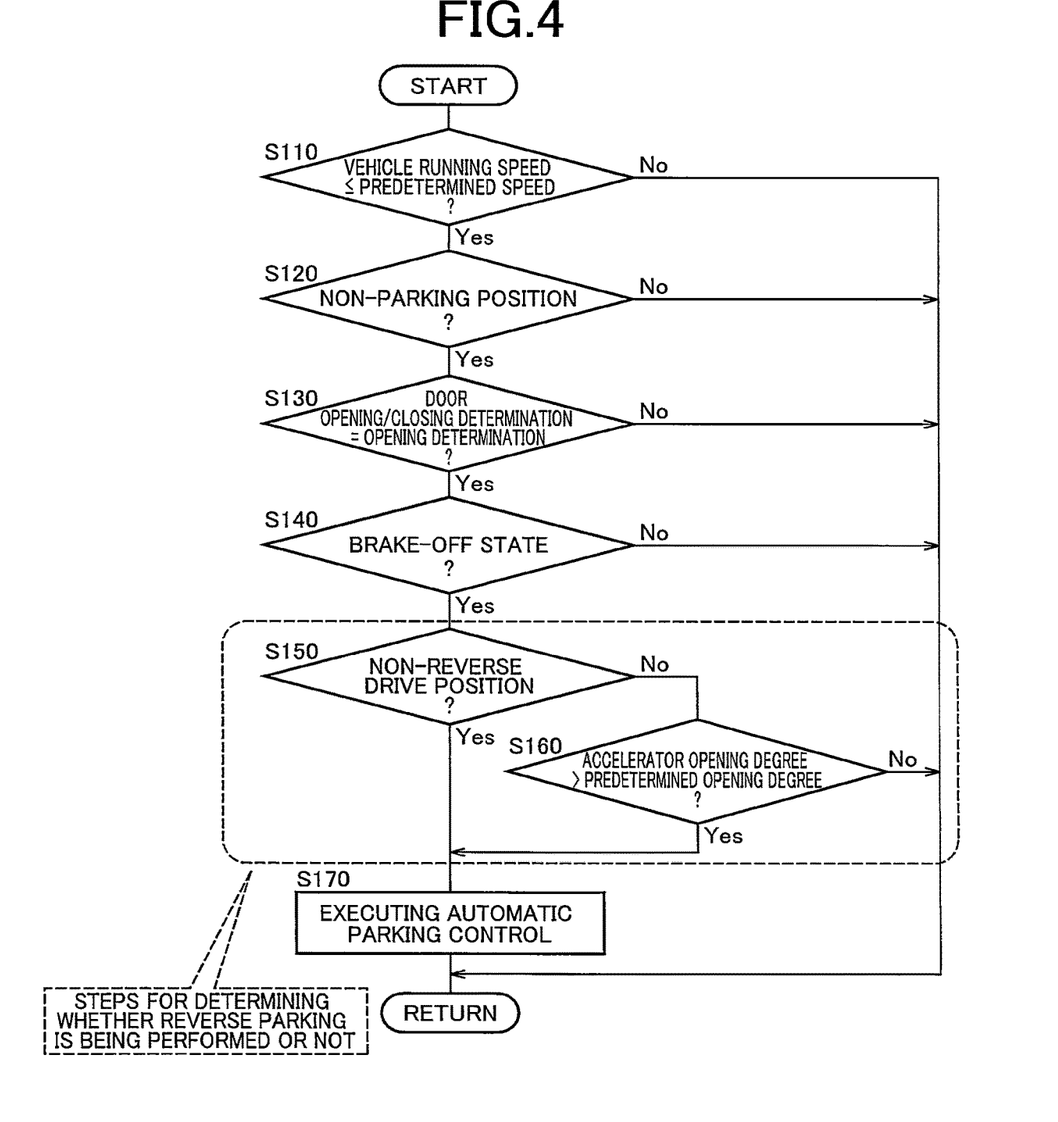
FIG. 4 is a flowchart for explaining a main part of a control operation of the electronic control device, and is a flowchart for explaining a control routine executed for performing a reverse parking while a driver of the vehicle opens a driver's seat door and visually checks a rear side of the vehicle while operating automatic parking control functions.

FIG. 4 is a flowchart for explaining a main part of a control operation of the electronic control device 90, and is a flowchart for explaining a control routine executed for performing the reverse parking while the driver opens the driver's seat door 62 and visually checks the rear side of the vehicle 10 while operating functions of the automatic parking control CNap. This control routine is executed in a repeated manner, for example.

As shown in FIG. 4, the control routine is initiated with S110 corresponding to function of the switching control portion 94, it is determined whether or not the running speed V is equal to or lower than the predetermined speed Vf. If the determination of S110 is negative, one cycle of execution of the control routine is terminated. If the determination in S110 is positive, it is determined in S120 corresponding to function of the switching control portion 94 whether or not the non-parking position is established as one of the shift positions POSsh. If the determination of S120 is negative, one cycle of execution of the control routine is terminated. If the determination in S120 is positive, it is determined in S130 corresponding to function of the opening/closing determination portion 92 whether or not the door opening/closing determination is the opening determination. If the determination of S130 is negative, one cycle of execution of the control routine is terminated. If the determination in S130 is positive, it is determined in S140 corresponding to function of the switching control portion 94 whether the brake-OFF state is established or not. If the determination of S140 is negative, one cycle of execution of the control routine is terminated. If the determination of S140 is positive, it is determined whether or not a non-reverse drive position is established as one of the shift positions POSsh in S150 corresponding to function of the reverse-parking determination portion 96. If the determination of S150 is negative, it is determined whether or not the accelerator opening degree θacc exceeds the predetermined opening degree θaccf in the S160 corresponding to function of the reverse-parking determination portion 96. If the determination of the S160 is negative, one cycle of execution of the control routine is terminated, and the automatic parking control CNap is not executed. On the other hand, when the determination of S150 is positive or when the determination of S160 is positive, the automatic parking control CNap is executed in S170 corresponding to function of the switching control portion 94.

As described above, according to the present embodiment, the automatic parking control CNap is executed, in a case in which the door opening/closing determination is the opening determination, when the running speed V is not higher than the predetermined speed Vf, with the power transmission device 16 being placed in the non-parking state. However, when it is determined that the driver is performing the reverse parking, the automatic parking control CNap is not executed. Therefore, while the function of the automatic parking control CNap is being operated, the driver can open the driver's seat door 62 and perform the reverse parking while visually checking the rear side of the vehicle 10.

According to the present embodiment, when the power transmission device 16 is in the reverse-running enabling state, with the accelerator opening degree θacc being equal to or smaller than the predetermined opening degree θaccf, it is determined that the driver is performing the reverse parking. Thus, it is appropriately determined that the reverse parking is being executed. Also, existing sensors are used to determine whether the reverse parking is being performed or not.

According to the present embodiment, the predetermined opening degree θaccf is the predetermined upper limit of the accelerator opening degree θacc, such that it can be determined that the driver has the intention of performing the reverse parking as long as the accelerator opening degree is not larger than the predetermined opening degree θaccf as the predetermined upper limit. Thus, it is more appropriately determined that the reverse parking is being executed. The predetermined opening degree θaccf is set based on the inclination angle θinc of the vehicle 10. Thus, it is appropriately determined that the reverse parking is being performed regardless of whether the road is a flat road or a slope road. For example, when the reverse parking it to be performed in a parking space on a downhill, the driver can open the driver's seat door 62 and perform the reverse parking while visually checking the rear side of the vehicle 10.

According to the present embodiment, when the running speed V is equal to or lower than the predetermined speed Vf and the power transmission device 16 is in the non-parking state, if it is determined that the door opening/closing determination is the opening determination and the reverse parking is not being performed by the driver, the automatic parking control CNap is executed. Thus, when the driver opens the driver's seat door 62 without the reverse parking being performed, the automatic parking control CNap is appropriately executed.

Further, according to the present embodiment, when the power transmission device 16 is the forward-running enabling state or in the neutral state, it is determined that the driver is not performing the reverse parking. Alternatively, when the power transmission device 16 is in the state in which the vehicle 10 can run backward but the accelerator opening degree θacc exceeds the predetermined opening degree θaccf, it is determined that the reverse parking is not being executed by the driver. Thus, it is appropriately determined that the reverse parking is not being performed.

Although the embodiment of the present invention has been described in detail with reference to the drawings, the present invention is also applicable to other aspects.

For example, in the above-described embodiment, it may be determined whether or not the driver is performing the reverse parking by determining whether or not the driver is trying to park the vehicle 10 in a parking frame located on the rear side of the vehicle 10 based on an image captured by a rear camera or the like.

In the above-described embodiment, only one sensor for detecting opening and closing of the driver's seat door 62 may be provided for the driver's seat door 62. In this case, the door opening/closing determination is made by using the one sensor that detects opening/closing of the driver's seat door 62.

In the above-described embodiment, the shift operation device 30 may be a device including one operation element such as a lever or a dial that is operated to one of the operation positions POSop corresponding to the shift positions POSsh, and a position sensor electrically detecting a position of the operation element.

In the above-described embodiment, the switching device 40 may be a switching device that is operated to establish one of the shift positions POSsh including the parking position, the reverse drive position, the neutral position and the forward drive position.

In the above-described embodiment, the present invention can be applied to any vehicle that includes a power transmission device that transmits power of a power source to drive wheels, and a switching device that switches the power transmission device between a parking state and a non-parking state based on a control command signal.

The above description is merely one embodiment, and the present invention can be implemented in a mode in which various modifications and improvements are added based on the knowledge of those skilled in the art.

NOMENCLATURE OF ELEMENTS

10: vehicle
12: power source
14: drive wheel
16: power transmission device
20: output shaft (rotary member)
40: switching device
62: driver's seat door (door)
90: electronic control device (control device)
92: opening/closing determination portion
94: switching control portion
96: reverse-parking determination portion

What is claimed is:
1. A control device for a vehicle that includes (i) a power source, (ii) a drive wheel, (iii) a power transmission device which is configured to transmit a power of the power source to the drive wheel and which includes a rotary member rotatable together with the drive wheel, and (iv) a switching device that is configured to switch the power transmission device between a parking state and a non-parking state in accordance with a control command signal, such that the rotary member is inhibited from being mechanically rotated when the power transmission device is placed in the parking state, and such that the rotary member is allowed to be rotated when the power transmission device is placed in the non-parking state, the control device comprising:
an opening/closing determination portion configured to make a door opening/closing determination as to whether a door of the vehicle is open or closed;
a switching control portion configured to execute an automatic parking control for causing the switching device to switch the power transmission device to the parking state, in a case in which the door opening/closing determination is an opening determination indicating that the door is open, when a running speed of the vehicle is not higher than a predetermined speed close to zero, with the power transmission device being placed in the non-parking state, and
a reverse-parking determination portion configured to determine whether or not a driver of the vehicle is performing a reverse parking for parking the vehicle by reversing the vehicle,
wherein the switching control portion does not execute the automatic parking control, in a case in which the reverse-parking determination portion determines that the driver is performing the reverse parking.

2. The control device according to claim 1,
wherein the reverse-parking determination portion determines that the driver is performing the reverse parking, in a case in which the power transmission device is placed in a state enabling the vehicle to perform a reverse running, with an accelerator opening degree being not larger than a predetermined opening degree.

3. The control device according to claim 2,
wherein the predetermined opening degree is a predetermined upper limit of the accelerator opening degree, such that it can be determined that the driver has an intention of performing the reverse parking as long as the accelerator opening degree is not larger than the predetermined opening degree as the predetermined upper limit, and
wherein the reverse-parking determination portion sets the predetermined opening degree based on an inclination angle of the vehicle.

4. The control device according to claim 1,
wherein the switching control portion executes the automatic parking control, in a case in which the reverse-parking determination portion determines that the driver is not performing the reverse parking, with the door opening/closing determination being the opening determination, when the power transmission device is placed in the non-parking state, with the running speed of the vehicle being not higher than the predetermined speed.

5. The control device according to claim 4,
wherein the reverse-parking determination portion determines that the driver is not performing the reverse parking, in a case in which the power transmission device is placed in a state enabling the vehicle to perform a forward running, in a case in which the power transmission device is placed in a state interrupting a power transmission, or in a case in which the power transmission device is placed in a state enabling the vehicle to perform a reverse running, with an accelerator opening degree being larger than a predetermined opening degree.

* * * * *